US012763257B2

(12) United States Patent
Fukui et al.

(10) Patent No.: US 12,763,257 B2
(45) Date of Patent: Oct. 13, 2026

(54) ELECTRONIC COMPONENT AND METHOD FOR PRODUCING ELECTRONIC COMPONENT

(71) Applicant: Murata Manufacturing Co., Ltd., Nagaokakyo (JP)

(72) Inventors: Shoji Fukui, Nagaokakyo (JP); Junichi Kawasaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 95 days.

(21) Appl. No.: 18/616,235

(22) Filed: Mar. 26, 2024

(65) Prior Publication Data

US 2024/0331943 A1 Oct. 3, 2024

(30) Foreign Application Priority Data

Mar. 31, 2023 (JP) ................................ 2023-058771

(51) Int. Cl.

| | |
|---|---|
| ***H01G 4/224*** | (2006.01) |
| ***H01G 4/008*** | (2006.01) |
| ***H01G 4/012*** | (2006.01) |
| ***H01G 4/12*** | (2006.01) |
| ***H01G 4/30*** | (2006.01) |

(52) U.S. Cl.

CPC ............ *H01G 4/224* (2013.01); *H01G 4/008* (2013.01); *H01G 4/012* (2013.01); *H01G 4/1218* (2013.01); *H01G 4/30* (2013.01)

(58) Field of Classification Search

CPC ........ H01G 4/224; H01G 4/008; H01G 4/012; H01G 4/1218; H01G 4/30

See application file for complete search history.

(56) References Cited

U.S. PATENT DOCUMENTS

2012/0327556 A1* 12/2012 Ahn ......................... H01G 4/12 361/321.2
2014/0233148 A1* 8/2014 Jeon ......................... H01G 4/12 427/79
2015/0348712 A1* 12/2015 Lee .......................... H01G 4/30 156/89.12
2020/0286229 A1 9/2020 Ogino et al.
2020/0312569 A1* 10/2020 Uchida .................... H01G 4/30

(Continued)

FOREIGN PATENT DOCUMENTS

JP 2020-144700 A 9/2020
JP 2020-188086 A 11/2020

*Primary Examiner* — Michael P Mcfadden
(74) *Attorney, Agent, or Firm* — Keating & Bennett, LLP

(57) ABSTRACT

An electronic component includes an element body including a stack and a side margin, the stack having a rectangular or substantially rectangular parallelepiped shape and including main surfaces opposing each other in a thickness direction, side surfaces opposing each other in a width direction orthogonal or substantially orthogonal to the thickness direction, and end surfaces opposing each other in a length direction orthogonal or substantially orthogonal to the thickness direction and the width direction, the stack including an internal electrode layer and a dielectric layer alternately stacked in the thickness direction, the side margin covering each of side surfaces of the stack in the width direction, and an external electrode covering one of the end surfaces of the element body in the length direction and electrically connected to the internal electrode layer.

20 Claims, 8 Drawing Sheets

(56) References Cited

U.S. PATENT DOCUMENTS

| | | | | |
|---|---|---|---|---|
| 2020/0312570 | A1* | 10/2020 | Hashimoto | H01G 4/1227 |
| 2020/0365328 | A1 | 11/2020 | Mizuno | |
| 2021/0012968 | A1* | 1/2021 | Taniguchi | H01G 4/1227 |
| 2022/0130612 | A1* | 4/2022 | Lee | H01G 4/008 |
| 2022/0208455 | A1* | 6/2022 | Nam | H01G 4/1227 |
| 2023/0081197 | A1* | 3/2023 | Inomata | H01G 4/30<br>361/321.4 |
| 2024/0212938 | A1* | 6/2024 | Matsumoto | H01G 4/1209 |

* cited by examiner

ELECTRONIC COMPONENT AND METHOD FOR PRODUCING ELECTRONIC COMPONENT

CROSS-REFERENCE TO RELATED APPLICATIONS

The present application claims priority under 35 U.S.C. § 119 to Japanese Patent Application No. 2023-058771, filed on Mar. 31, 2023, the entire contents of which are hereby incorporated herein by reference in their entirety.

BACKGROUND OF THE INVENTION

1. Field of the Invention

The present invention relates to electronic components and methods for producing electronic components.

2. Description of the Related Art

An electronic component such as a ceramic capacitor including a stack in which an internal electrode layer and a dielectric layer are stacked may be provided with a protective part for protecting the periphery of the internal electrode layer.

For example, JP 2020-188086 A discloses a method for producing a multilayer ceramic capacitor including preparing a stack in which an internal electrode and a dielectric layer are stacked, providing a side margin part serving as a protective part on a side surface of the stack, and then forming an external electrode on an end surface. JP 2020-188086 A also discloses, as a method for producing a stack, a method in which a large number of stacks are produced at one time by stacking an internal electrode having a large area and a sheet serving as a dielectric layer having a large area, and then dividing the stack into individual pieces.

However, there is a problem that peeling easily occurs between the internal electrode and the dielectric layer defining the stack since the internal electrode and the dielectric layer have different physical properties. This problem is likely to occur particularly when the stack is divided into individual pieces or when the side margin part is formed.

SUMMARY OF THE INVENTION

Example embodiments of the present invention provide electronic components in each of which peeling does not occur, or only barely occurs, between an internal electrode layer and a dielectric layer.

An example embodiment of an electronic component of the present invention includes an element body including a stack and a side margin, the stack having a rectangular or substantially rectangular parallelepiped shape and including main surfaces opposing each other in a thickness direction, side surfaces opposing each other in a width direction orthogonal or substantially orthogonal to the thickness direction, and end surfaces opposing each other in a length direction orthogonal or substantially orthogonal to the thickness direction and the width direction, the stack including an internal electrode layer and a dielectric layer stacked in the thickness direction, the side margin covering each of side surfaces of the stack in the width direction, and an external electrode covering one of the end surfaces of the element body in the length direction and electrically connected to the internal electrode layer, the stack including a first portion located at an end in the width direction of the stack in a portion sandwiched between the internal electrode layers in the thickness direction, and a second portion located at a center in the width direction of the stack in the portion sandwiched between the internal electrode layers in the thickness direction, an average particle size of dielectric grains included in the first portion including being larger than an average particle size of dielectric grains included in the second portion.

An example embodiment of a method for producing an electronic component of the present invention includes a stack precursor preparation step of preparing a stack precursor having rectangular or substantially rectangular parallelepiped shape, the stack precursor including main surfaces opposing each other in a thickness direction, side surfaces opposing each other in a width direction orthogonal or substantially orthogonal to the thickness direction, and end surfaces opposing each other in a length direction orthogonal or substantially orthogonal to the thickness direction and the width direction, the stack precursor including a conductive paste layer to be an internal electrode layer and a dielectric ceramic layer to be a dielectric layer stacked in the thickness direction, the conductive paste layer being exposed to the side surfaces and the end surfaces, a side surface heating step of heating the side surfaces of the stack precursor to remove the conductive paste layer exposed to the side surfaces of the stack precursor and to cause particle growth of dielectric grains included in the dielectric ceramic layer adjacent to the conductive paste layer exposed to the side surfaces of the stack precursor, a side margin forming step of forming a side margin on two side surfaces in the width direction of the stack precursor that has been heated, a baking step of baking the stack precursor on which the side margin is formed to obtain an element body, and an external electrode forming step of forming an external electrode that covers one of the end surfaces in the length direction of the element body and is electrically connected to the internal electrode layer.

Example embodiments of the present invention are able to provide electronic components in each of which peeling does not occur or hardly occurs between an internal electrode layer and a dielectric layer.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Hereinafter, electronic components and methods for producing electronic components according to example embodiments of the present invention will be described. The present invention is not limited to the following configurations, and can be appropriately modified and applied without changing the scope of the present invention. The present invention also includes a combination of two or more of individual desirable configurations of the present invention described below.

In the present specification, the term indicating the relationship between elements (such as "opposite" or "orthogonal") and the term indicating the shape of elements (such as "rectangular or parallelepiped") are not expressions indicating only strict meanings, but are expressions meaning to include a substantially equal range, for example, a difference of about several %.

The drawings described below are schematic views, and the scale and the like of the dimensions, the aspect ratio, and the like may be different from those of actual products.

An electronic component according to an example embodiment of the present invention preferably includes an element body including a stack and a side margin, the stack having a rectangular or substantially rectangular parallelepiped shape and including main surfaces opposing each other in a thickness direction, side surfaces opposing each other in a width direction orthogonal or substantially orthogonal to the thickness direction, and end surfaces opposing each other in a length direction orthogonal or substantially orthogonal to the thickness direction and the width direction, the stack including an internal electrode layer and a dielectric layer stacked in the thickness direction, the side margin covering each of side surfaces of the stack in the width direction, and an external electrode that covers one of the end surfaces of the element body in the length direction and is electrically connected to the internal electrode layer, the stack including a first portion located at an end in the width direction of the stack in a portion sandwiched between the internal electrode layers in the thickness direction, and a second portion located at a center in the width direction of the stack in the portion sandwiched between the internal electrode layers in the thickness direction, an average particle size of dielectric grains included in the first portion being larger than an average particle size of dielectric grains included in the second portion.

Figure 1:
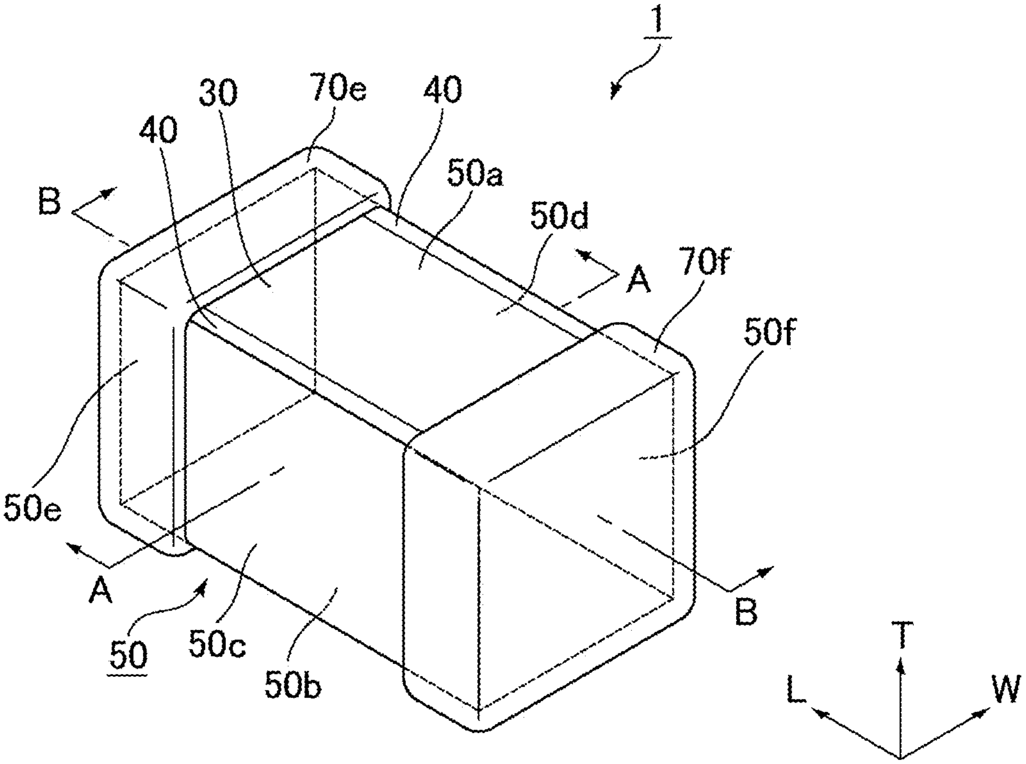
FIG. 1 is a perspective view schematically illustrating an example embodiment of an electronic component of the present invention.

FIG. 1 is a perspective view schematically illustrating an example embodiment of an electronic component of the present invention.

An electronic component 1 illustrated in FIG. 1 includes a rectangular or substantially rectangular parallelepiped element body 50, a first external electrode 70*e*, and a second external electrode 70*f*. The element body 50 includes a first main surface 50*a* and a second main surface 50*b* that are main surfaces opposing each other in a thickness direction (direction indicated by the arrow T in FIG. 1), a first side surface 50*c* and a second side surface 50*d* that are side surfaces opposing each other in a width direction (direction indicated by the arrow W in FIG. 1) orthogonal or substantially orthogonal to the thickness direction, and a first end surface 50*e* and a second end surface 50*f* that are end surfaces opposing each other in a length direction (direction indicated by the arrow L in FIG. 1) orthogonal or substantially orthogonal to the thickness direction and the width direction. The first external electrode 70*e* and the second external electrode 70*f* respectively cover the first end surface 50*e* and the second end surface 50*f* of the element body 50.

The first external electrode 70*e* preferably covers a portion of the first main surface 50*a*, the second main surface 50*b*, the first side surface 50*c*, and the second side surface 50*d* in addition to the first end surface 50*e* of the element body so as to extend from the first end surface 50*e* and wrap around the portion.

The second external electrode 70*f* covers a portion of the first main surface 50*a*, the second main surface 50*b*, the first side surface 50*c*, and the second side surface 50*d* in addition to the second end surface 50*f* of the element body so as to extend from the second end surface 50*f* and wrap around the portion.

The first external electrode 70*e* and the second external electrode 70*f* cover a portion of the surfaces of the first main surface 50*a*, the second main surface 50*b*, the first side surface 50*c*, and the second side surface 50*d*, respectively, but are not in contact with each other.

Figure 2:
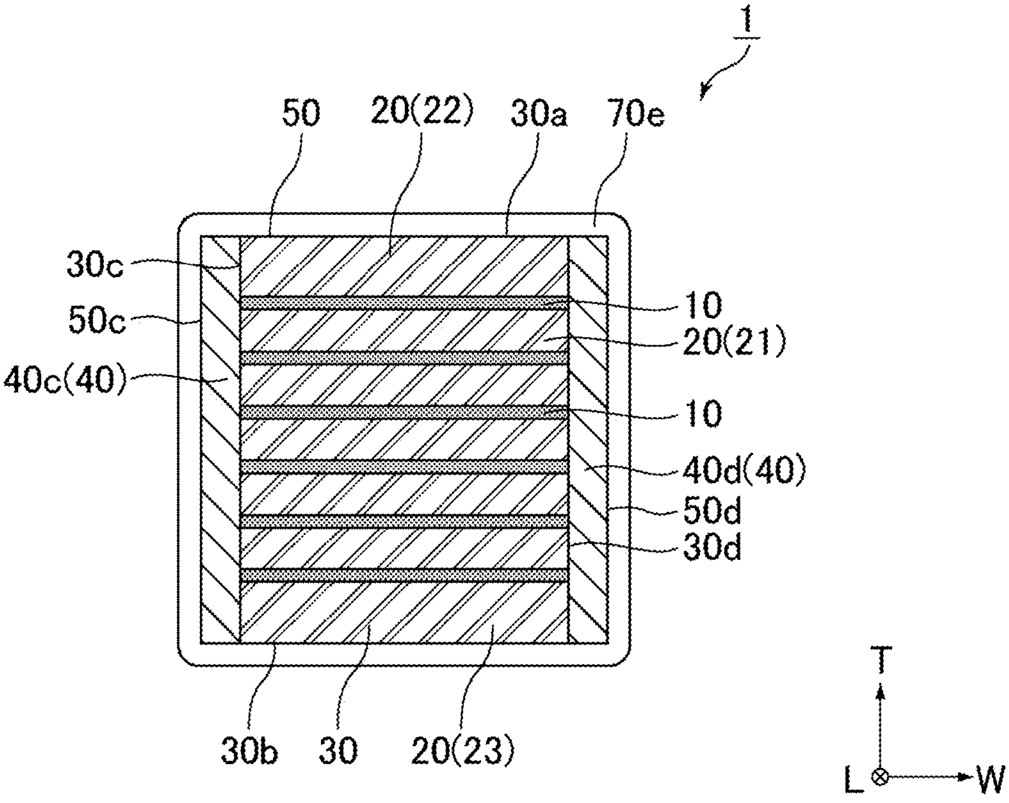
FIG. 2 is a cross-sectional view of the electronic component illustrated in FIG. 1 taken along the line A-A.

FIG. 2 is a cross-sectional view of the electronic component illustrated in FIG. 1 taken along the line A-A.

Since the cross-sectional view illustrated in FIG. 2 is a cross section parallel or substantially parallel to the width direction (W) and the thickness direction (T) of the electronic component 1 illustrated in FIG. 1, the cross section is also referred to as a WT cross section.

As illustrated in FIG. 2, the element body 50 preferably includes a stack 30, and a first side margin 40*c* and a second side margin 40*d* that respectively cover a first side surface 30*c* and a second side surface 30*d* which are side surfaces of the stack 30 in the width direction.

The stack 30 is formed by stacking an internal electrode layer 10 and a dielectric layer 20 in a thickness direction.

The internal electrode layer 10 is exposed to the first side surface 30*c* and the second side surface 30*d* of the stack 30.

The dielectric layer 20 includes an intermediate dielectric layer 21, an upper dielectric layer 22, and a lower dielectric layer 23.

The intermediate dielectric layer 21 is a portion of the dielectric layer 20 sandwiched between two internal electrode layers 10.

The upper dielectric layer 22 is the dielectric layer 20 adjacent to one internal electrode layer 10 and located on the first main surface 30*a* side of the stack 30.

The lower dielectric layer 23 is the dielectric layer 20 adjacent to one internal electrode layer 10 and located on the second main surface 30*b* side of the stack 30.

In the electronic component 1 illustrated in FIG. 2, the internal electrode layer 10 is exposed to the first side surface 30*c* and the second side surface 30*d* of the stack 30, but in the electronic components of example embodiments of the present invention, the internal electrode layer does not have to be exposed to the first side surface and the second side surface of the stack.

The first side margin 40*c* covers the entire or substantially the entire first side surface 30*c* of the stack 30. That is, of the dielectric layers 20 defining the stack 30, the side surfaces of the upper dielectric layer 22 and the lower dielectric layer 23 on the first side surface 30*c* side are also covered with the first side margin 40*c*.

Similarly, the side surfaces of the upper dielectric layer 22 and the lower dielectric layer 23 on the second side surface 30*d* side are also covered with the second side margin 40*d*.

The boundary between the stack 30 and the first side margin 40*c* and the boundary between the stack 30 and the second side margin 40*d* can be determined from the fact that an interface is provided and the fact that particle sizes are different when the WT cross section of the electronic component is observed with a scanning electron microscope (SEM).

Figure 3:
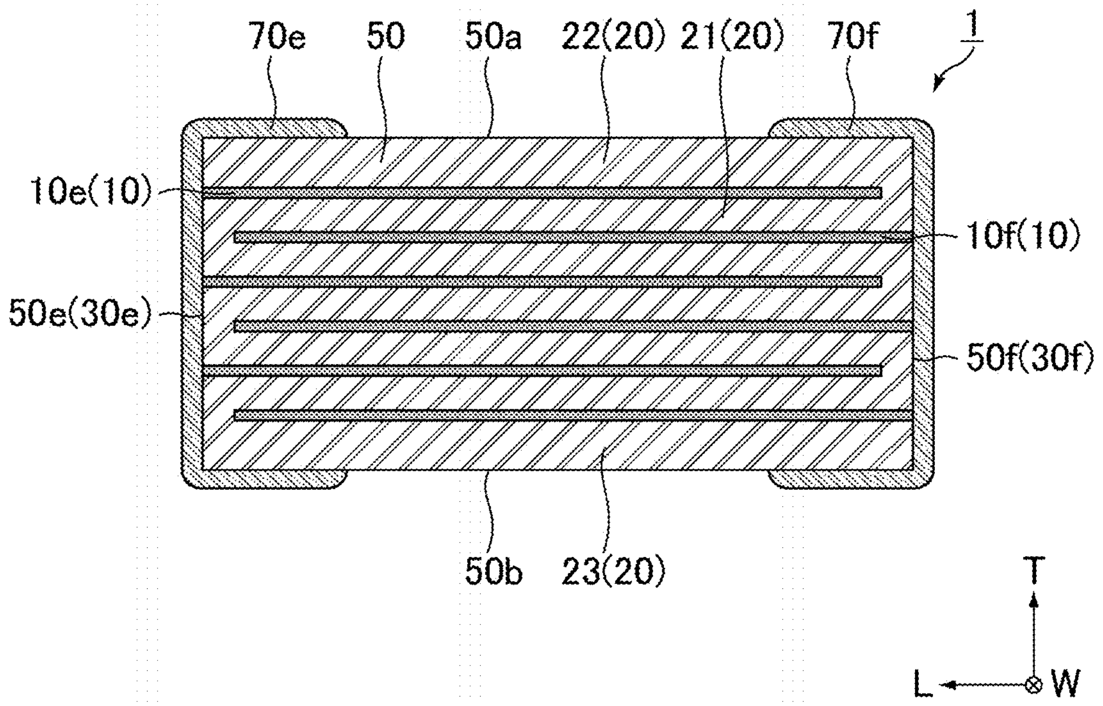
FIG. 3 is a cross-sectional view of the electronic component illustrated in FIG. 1 taken along the line B-B.

FIG. 3 is a cross-sectional view of the electronic component illustrated in FIG. 1 taken along the line B-B.

Since the cross-sectional view illustrated in FIG. 3 is a cross section parallel or substantially parallel to the length direction (L) and the thickness direction (T) of the electronic component 1, the cross section is also referred to as an LT cross section.

As illustrated in FIG. 3, the internal electrode layer 10 includes a first internal electrode layer 10*e* exposed to the first end surface 50*e* of the element body 50 and electrically connected to the first external electrode 70*e*, and a second internal electrode layer 10*f* exposed to the second end surface 50*f* of the element body 50 and electrically connected to the second external electrode 70*f*.

The first end surface 30*e* and a side margin (not illustrated) of the stack 30 are exposed to the first end surface 50*e* of the element body 50. Thus, a portion where the stack 30 is exposed in the first end surface 50*e* of the element body 50 is also the first end surface 30*e* of the stack 30.

Thus, it can also be said that the first internal electrode layer 10*e* is exposed to the first end surface 30*e* of the stack 30. It can also be said that the first external electrode 70*e* covers the first end surface 30*e* of the stack 30.

The second end surface 30*f* and a side margin (not illustrated) of the stack 30 are exposed to the second end surface 50*f* of the element body 50. Thus, a portion where the stack 30 is exposed in the second end surface 50*f* of the element body 50 is also the second end surface 30*f* of the stack 30.

Thus, it can also be said that the second internal electrode layer 10*f* is exposed to the second end surface 30*f* of the stack 30. It can also be said that the second external electrode 70*f* covers the second end surface 30*f* of the stack 30.

In the internal electrode layers 10, regions opposing each other with the intermediate dielectric layer 21 interposed therebetween are also referred to as counter electrode portions, and a region other than the counter electrode portion is also referred to as an extraction electrode portion.

The distance from the end of the first internal electrode layer 10*e* on the second end surface 50*f* side to the second end surface 50*f* of the element body 50 and the distance from the end of the second internal electrode layer 10*f* on the first end surface 50*e* side to the first end surface 50*e* of the element body 50 in the length direction are also referred to as L gaps.

Hereinafter, preferable aspects of each configuration of the electronic component of the present invention will be described.

Dielectric Layer

The dielectric layer includes a dielectric ceramic. Examples of the dielectric ceramic include, for example, barium titanate ($BaTiO_3$), calcium titanate ($CaTio_3$), strontium titanate ($SrTiO_3$), magnesium titanate ($MgTiO_3$), calcium zirconate ($CaZrO_3$), calcium zirconate titanate [$Ca(Zr, Ti)O_3$], barium zirconate ($BaZrO_3$), and titanium oxide ($TiO_2$).

The thickness of the dielectric layer may be different among the intermediate dielectric layer, the upper dielectric layer, and the lower dielectric layer. Among the dielectric layers, a region sandwiched between two internal electrode layers is the intermediate dielectric layer.

A Mn compound, a Fe compound, a Cr compound, a Co compound, a Ni compound, or the like may also be added to these components if so desired. In addition to the above components, Ho, Dy, Tb, or the like, for example, may be included.

The dielectric layer preferably includes particles (dielectric grains) of dielectric ceramics as a main component.

The dielectric grains may have a core-shell structure. As the particle size of the dielectric grains becomes larger, the thickness of the shell portion of the core-shell structure may be thicker. When the thickness of the shell portion is large, reliability improves. Among the dielectric layers, a dielectric layer adjacent to one internal electrode layer and located closest to the first main surface of the stack is the upper dielectric layer. Among the dielectric layers, a dielectric layer adjacent to one internal electrode layer and disposed closest to the second main surface of the dielectric layer is the lower dielectric layer.

The thickness of the intermediate dielectric layer is preferably, for example, about 0.3 μm or more and about 0.45 μm or less per layer. The thickness of each of the upper dielectric layer and the lower dielectric layer is preferably, for example, about 10 μm or more and about 30 μm or less.

The thickness of the dielectric layer is measured by the following method.

First, the WT cross section of the stack is exposed by polishing, and the surface is observed with a scanning electron microscope after polishing. Assuming five lines that divide the stack into six equal parts in the width direction, the average value of the thickness of the dielectric layer on each line is defined as the thickness of the dielectric layer.

The number of dielectric layers is not limited, but is preferably, for example, 100 or more and 600 or less.

The number of upper dielectric layers and the number of lower dielectric layers are also included in the number of dielectric layers.

Internal Electrode Layer

Examples of the conductive material defining the internal electrode layer include, for example, Ni, Cu, Ag, Pd, Au, and alloys thereof.

The thickness of the internal electrode layer is preferably, for example, about 0.3 μm or more and about 0.45 μm or less, and more preferably about 0.3 μm or more and about 0.38 μm or less per layer.

The number of internal electrode layers is preferably, for example, 100 or more and 600 or less.

The thickness of the internal electrode layer is measured by the following method.

First, the WT cross section of the stack is exposed by polishing, and the surface is observed with a scanning electron microscope after polishing. Assuming five lines that divide the stack into six equal parts in the width direction, the average value of the thicknesses of the internal electrode layers on each line is defined as the thickness of the internal electrode layer.

The projected area of the internal electrode layer in the stacking direction is preferably, for example, about 80% or more and about 95% or less of the projected area of the dielectric layer in the stacking direction.

The internal electrode layer may include a dielectric ceramic having the same composition as the dielectric ceramic included in the dielectric layer.

Sn may be solid-solved in the surface layer of the internal electrode layer.

Sn forming a solid solution in the surface layer of the internal electrode layer improves reliability.

The internal electrode layer preferably includes a first internal electrode layer exposed to the first end surface of the stack but not exposed to the second end surface of the stack, and a second internal electrode layer exposed to the second end surface of the stack but not exposed to the first end surface of the stack.

The first internal electrode layer is exposed to the first end surface of the stack and electrically connected to the first external electrode.

The second internal electrode layer is exposed to the second end surface of the stack and electrically connected to the second external electrode.

The first internal electrode layer and the second internal electrode layer include counter electrode portions which are portions opposing each other in the thickness direction, and an extraction electrode portion from the counter electrode portion to the first end surface or the second end surface of the stack.

The first internal electrode layer and the second internal electrode layer oppose each other with the dielectric layer interposed therebetween, and thus the electronic component functions as a capacitor.

The distance from the end of the first internal electrode layer on the second end surface side to the second end surface and the distance from the end of the second internal electrode layer on the first end surface side to the first end surface are also referred to as L gaps.

The L gap is preferably, for example, about 5 μm or more and about 30 μm or less.

The positions of the ends of the internal electrode layers in the width direction are preferably aligned.

Specifically, the position of the ends of the internal electrode layers in the width direction is preferably, for example, within about 1 μm in the width direction.

For example, when the position of the ends on the first side surface side of the stack among the ends of the internal electrode layers defining the stack is viewed, the position of the end of the internal electrode layer disposed on the outermost side and the position of the end of the internal electrode layer disposed on the innermost side are preferably within about 1 μm in the width direction.

Similarly, when the position of the ends on the second side surface side of the stack is viewed, the position of the end of the internal electrode layer located on the outermost side and the position of the end of the internal electrode layer disposed on the innermost side are preferably within about 1 μm in the width direction.

In the electronic component of the present example embodiment, the average particle size of the dielectric grains included in a first portion is larger than the average particle size of the dielectric grains included in a second portion.

The stack includes a first portion and a second portion. The first portion is a portion located at an end in the width direction in the portion sandwiched between the internal electrode layers of the stack. The second portion is a portion located at a center in the width direction in the portion sandwiched between the internal electrode layers of the stack.

The first portion is preferably, for example, a portion of up to about 1 μm from one end (first side surface of the stack) in the width direction of the stack toward the other end (second side surface of the stack) in the width direction of the stack and a portion of up to about 1 μm from the other end (second side surface of the stack) in the width direction of the stack toward one end (first side surface of the stack) in the width direction of the stack in the portion sandwiched between the internal electrode layers of the stack. The second portion is preferably a portion other than the first portion in the portion sandwiched between the internal electrode layers of the stack.

That is, when the stack is viewed in the WT cross section, in the portion sandwiched between the internal electrode layers, a region up to about 1 μm in the width direction from a side surface of the stack is the first portion, and the other portion is the second portion.

Figure 4:
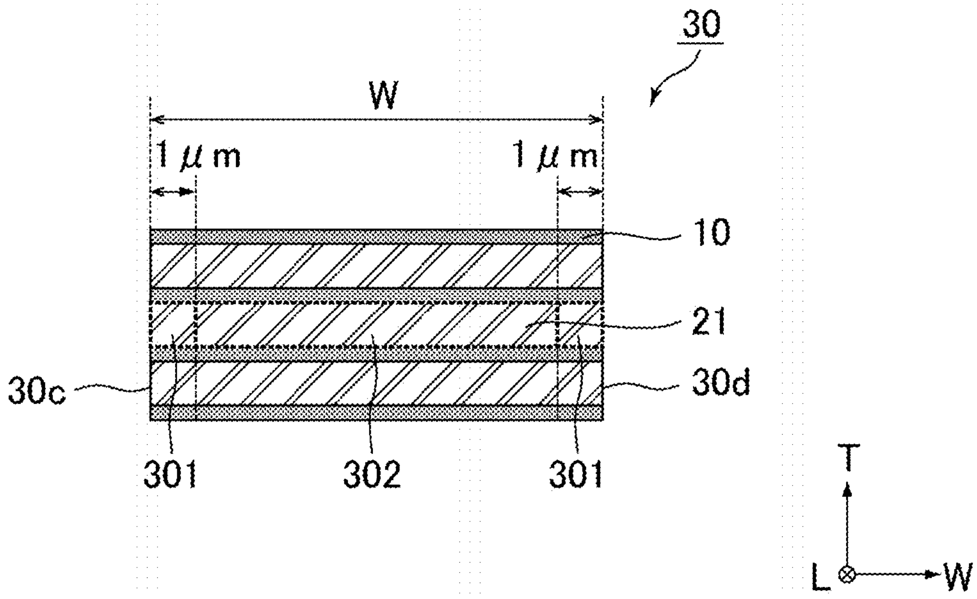
FIG. 4 is a partially enlarged view of a stack in FIG. 2.

FIG. 4 is a partially enlarged view of a stack in FIG. 2.

As illustrated in FIG. 4, the stack 30 preferably includes a first portion 301 and a second portion 302. The first portion 301 is a portion located at an end in the width direction of the stack 30 in the portion sandwiched between the two internal electrode layers 10. The second portion 302 is a portion located at the center in the width direction of the stack 30 in the portion sandwiched between the two internal electrode layers 10.

The length of the first portion 301 in the width direction is preferably, for example, about 1 μm. That is, in the portion sandwiched between the internal electrode layers 10, a region of about 1 μm from the first side surface 30*c* toward the second side surface 30*d* of the stack 30 and a region of about 1 μm from the second side surface 30*d* toward the first side surface 30*c* are the first portion 301.

In the portion sandwiched between the internal electrode layers 10 of the stack 30, a portion other than the first portion 301 is the second portion 302.

Figure 5:
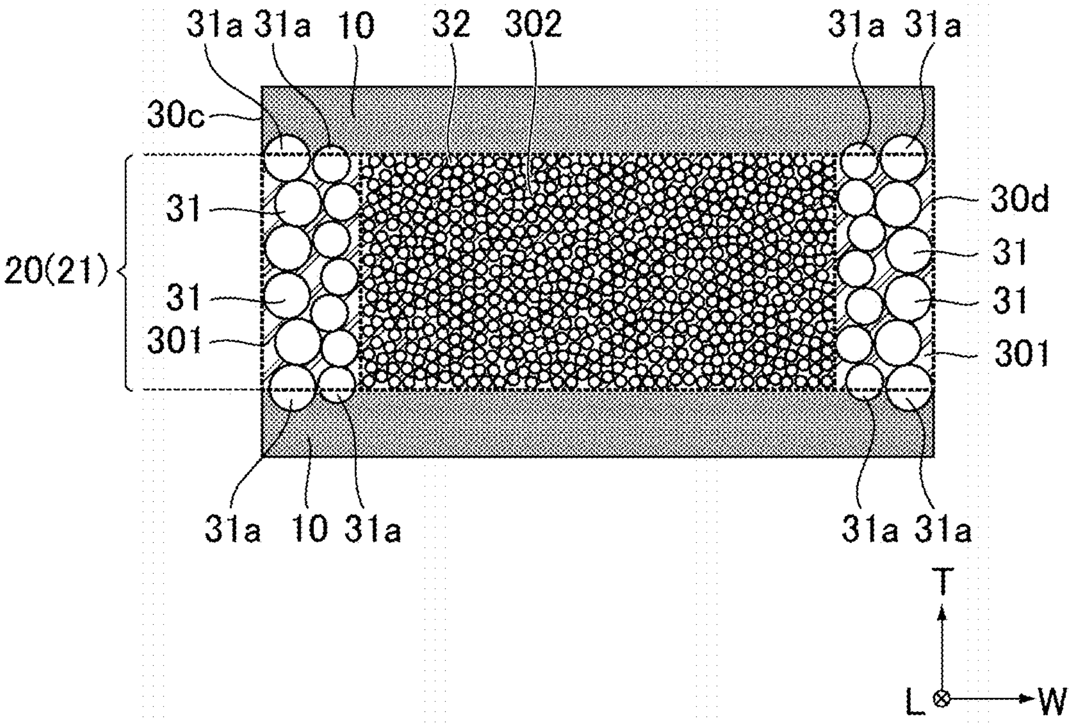
FIG. 5 is a view schematically illustrating a difference in particle size of dielectric grains in a further partially enlarged view of the stack illustrated in FIG. 4.

FIG. 5 is a view schematically illustrating a difference in particle size of dielectric grains in a further partially enlarged view of the stack illustrated in FIG. 4. The dielectric particles defining the dielectric layer are also referred to as dielectric grains.

As illustrated in FIG. 5, the average particle size of the dielectric grains 31 included in the first portion 301 is preferably larger than the average particle size of the dielectric grains 32 included in the second portion 302. Thus, the dielectric grains 31*a* included in the first portion 301 get stuck in the internal electrode layer 10, and the adhesion between the dielectric layer 20 and the internal electrode layer 10 is improved by the anchor effect, and peeling can be reduced or prevented from occurring.

Among the dielectric grains included in the first portion, the dielectric grains exposed to the side surface of the stack and the dielectric grains disposed inside the dielectric grains may have different particle sizes.

For example, in the stack 30 illustrated in FIG. 5, the average particle size of the dielectric grains exposed to the first side surface 30*c* or the second side surface 30*d* of the stack 30 among the dielectric grains included in the first portion 301 is larger than the average particle size of the dielectric grains not exposed to the side surfaces of the stack among the dielectric grains included in the first portion 301. The dielectric grains exposed to the side surfaces of the stack may react with surrounding additives when heated and have a core-shell structure.

The average particle size of the dielectric grains included in the second portion is preferably, for example, about 10 nm or more and less than about 200 nm.

The average particle size of the dielectric grains included in the first portion is preferably, for example, about 200 nm or more and about 1000 nm or less.

The average particle size of the dielectric grains (dielectric particles) can be measured using a scanning electron microscope (SEM). Specifically, an enlarged image of the intermediate dielectric layer in the vicinity of the center in the thickness direction of the stack is captured in the WT cross section of the stack using a SEM. In the captured image of the intermediate dielectric layer, the intermediate dielectric layer is divided into the first portion and the second portion, 20 dielectric grains are randomly selected from each of the first portion and the second portion, and the average value of the equivalent circle diameters obtained from the areas of the dielectric grains is taken as the average particle size of the dielectric grains of the portion. The visual field of the SEM when the area of the dielectric grain is obtained is, for example, about 15 μm×about 15 μm. The dielectric grains incompletely included (having a portion not displayed) in the visual field are not subject to particle size determination.

When the dielectric grains are provided across the first portion and the second portion, the dielectric grains are the dielectric grains included in both the first portion and the second portion.

However, when the average particle size of the dielectric grains included in the first portion and the average particle size of the dielectric grains included in the second portion are calculated, the dielectric grains included in both the first portion and the second portion are not subjected to the particle size calculation.

The dielectric grains included in the first portion may be necked to each other. When the dielectric grains are necked to each other in the first portion, the apparent average particle size of the dielectric grains increases, and the penetration of the dielectric grains into the internal electrode layer becomes strong, and thus adhesion between the internal electrode layer and the dielectric layer improves, and peeling of the internal electrode layer can be further reduced or prevented.

The dielectric grains included in the two first portions opposing each other with the internal electrode layer interposed therebetween may be necked to each other. At this time, the necked dielectric grains penetrate the internal electrode layer.

The average particle size of the dielectric grains included in the first portion is preferably, for example, about 2 times or more and about 10 times or less the average particle size of the dielectric grains included in the second portion.

The average particle size of the dielectric grains included in the first portion is preferably larger than the thickness of the internal electrode layer.

When the average particle size of the dielectric grains included in the first portion is larger than the thickness of the internal electrode layer, the dielectric grains included in the first portion easily get stuck in the internal electrode layer.

The stack further includes a third portion.

The third portion is a portion located at the end in the width direction of the stack in a portion sandwiched between the dielectric layers in the thickness direction.

At least a portion of the end in the width direction of the internal electrode layer is preferably covered with the dielectric grains included in the third portion.

Figure 6:
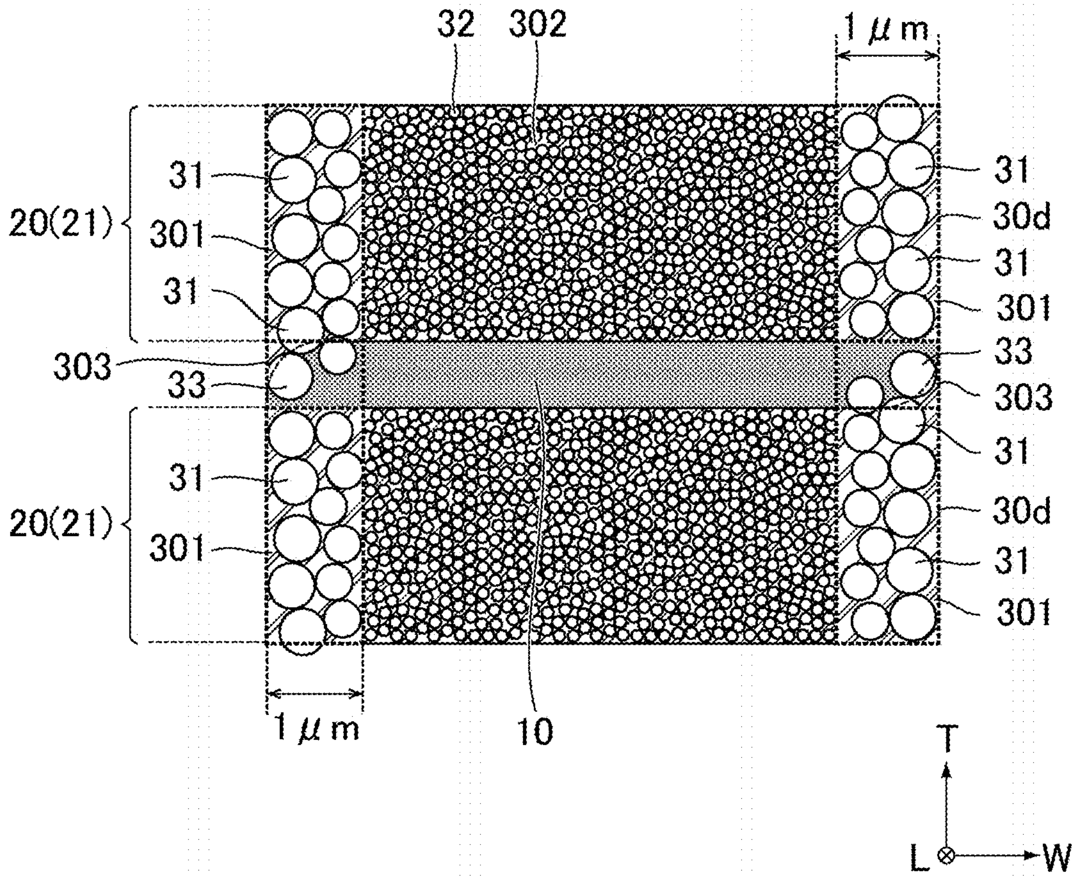
FIG. 6 is a partial cross-sectional view of a WT plane of a stack schematically illustrating a difference in particle size of dielectric grains in an example embodiment of the electronic component of the present invention.

FIG. 6 is a partial cross-sectional view of a WT plane of a stack schematically illustrating a difference in particle size of dielectric grains in another example of the electronic component of the present invention. FIG. 6 is also an example in which the dielectric grains included in the third portion of the stack cover a portion of the end in the width direction of the internal electrode layer.

The stack 30 illustrated in FIG. 6 has a third portion 303 at the end in the width direction in the portion sandwiched between the intermediate dielectric layers 21.

The length of the third portion 303 in the width direction is preferably, for example, about 1 μm. That is, in the portion sandwiched between the dielectric layer 20, a region of about 1 μm from the first side surface 30*c* toward the second side surface 30*d* side of the stack 30 and a region of about 1 μm from the second side surface 30*d* toward the first side surface 30*c* side are the third portion 303.

As illustrated in FIG. 6, a portion of the end surface in the width direction of the internal electrode layer 10 is covered with the dielectric grains 33 included in the third portion 303.

In FIG. 6, a portion covered with the dielectric grains 33 included in the third portion 303 in the end in the width direction of the internal electrode layer 10 is indicated by a broken line.

Covering at least a portion of the end in the width direction of the internal electrode layer with the dielectric grains included in the third portion improves the effect of reducing or preventing peeling of the internal electrode layer.

The average particle size of the dielectric grains included in the third portion is preferably larger than the average particle size of the dielectric grains included in the second portion.

In the stack 30 illustrated in FIG. 6, the average particle size of the dielectric grains 33 included in the third portion 303 is preferably larger than the average particle size of the dielectric grains 32 included in the second portion 302.

The average particle size of the dielectric grains included in the third portion is preferably, for example, about 200 nm or more and about 1000 nm or less.

The average particle size of the dielectric grains included in the third portion is preferably, for example, about 2 times or more and about 10 times or less the average particle size of the dielectric grains included in the second portion.

The dielectric grains included in the third portion may be necked to each other.

The dielectric grains included in the first portion and the dielectric grains included in the third portion may be necked.

The average particle size of the dielectric grains included in the third portion is preferably larger than the thickness of the internal electrode layer.

When the average particle size of the dielectric grains included in the third portion is larger than the thickness of the internal electrode layer, the third portion easily covers the entire or substantially the entire end surface of the internal electrode layer.

The entire or substantially the entire end of the internal electrode layer is preferably covered with the dielectric grains included in the third portion.

When the entire or substantially the entire end of the internal electrode layer is covered with the dielectric grains included in the third portion, peeling of the internal electrode layer can be particularly reduced or prevented.

Figure 7:
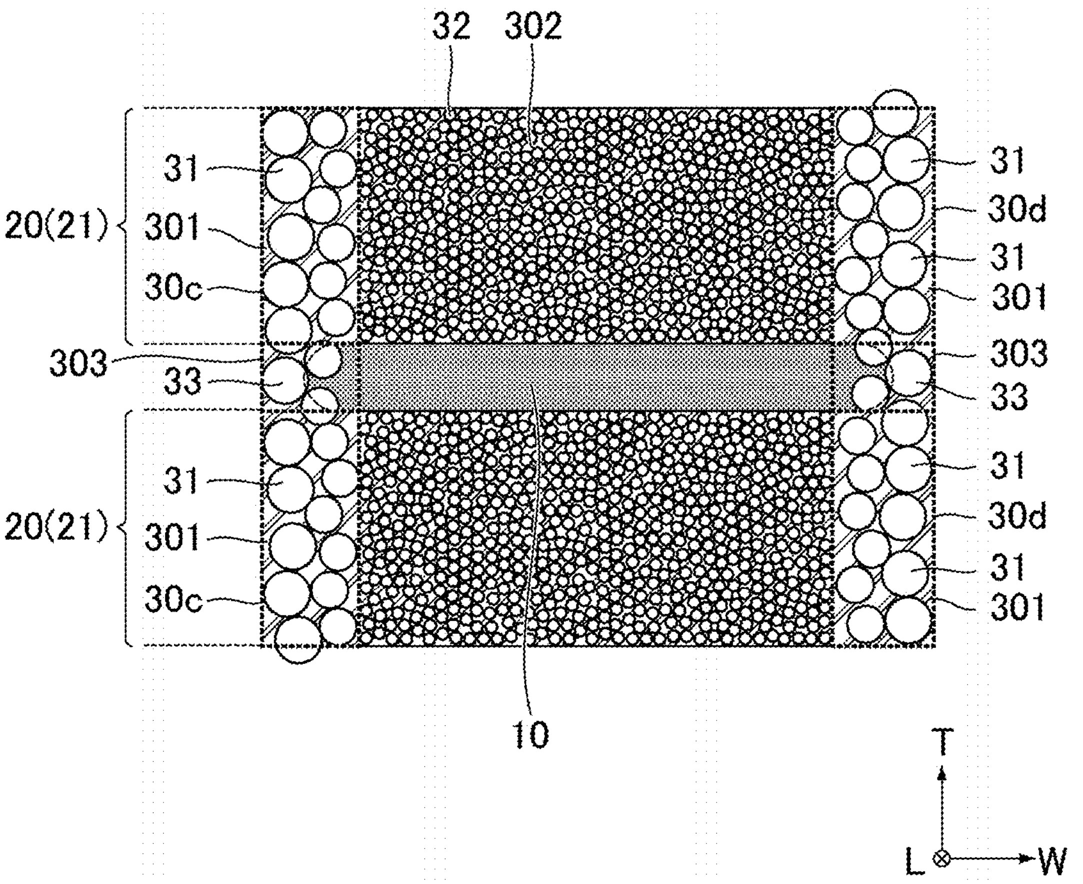
FIG. 7 is a partial cross-sectional view of a WT plane of a stack schematically illustrating a difference in particle size of dielectric grains in an example of the electronic component of the present invention.

FIG. 7 is a partial cross-sectional view of a WT plane of a stack schematically illustrating a difference in particle size of dielectric grains in another example embodiment of the electronic component of the present invention. FIG. 7 is also an example in which the dielectric grains included in the third portion of the stack cover the entire or substantially the entire end in the width direction of the internal electrode layer.

The stack 30 illustrated in FIG. 7 includes the third portion 303 at the ends in the width direction in the portion sandwiched between the dielectric layers 20.

The entire or substantially the entire end in the width direction of the internal electrode layer 10 defining the stack 30 is covered with the dielectric grains 33 included in the third portion 303.

In FIG. 7, a portion covered with the dielectric grains 33 included in the third portion 303 in the end in the width direction of the internal electrode layer 10 is indicated by a broken line.

The average particle size of the dielectric grains 33 included in the third portion 303 is preferably larger than the average particle size of the dielectric grains 32 included in the second portion 302.

The average particle size of the dielectric grains included in the third portion can be determined by the same method as the average particle size of the dielectric grains included in the first portion and the average particle size of the dielectric grains included in the second portion.

However, regarding the dielectric grains included in both the first portion and the third portion, the assignment to the first portion or the third portion is determined with reference to the center of gravity obtained from the outer shape of the dielectric grains. That is, when the particle size of the dielectric grain is obtained, the dielectric grain whose center of gravity is included in the first portion is treated as the dielectric grain included in the first portion, and the dielectric grain whose center of gravity is included in the third portion is treated as the dielectric grain included in the third portion.

When the center of gravity of the dielectric grain cannot be easily obtained, the assignment to the first portion or the third portion is determined by the following method. In this case, the grain in contact with the boundary with the side margin may be treated as the dielectric grain included in the third portion, and the dielectric grain included in the portion sandwiched between the end in the width direction of the internal electrode layer and the end of the stack may be treated as the dielectric grain included in the first portion.

Side Margin

Next, the side margins provided on the side surfaces of the stack will be described.

Each side surface of the stack is covered with a side margin. The side margin located on the first side surface side of the stack is the first side margin. The side margin located on the second side surface side of the stack is the second side margin.

As the material defining the side margins, the same material as the material of the dielectric layer described above can be suitably used. The material defining the dielectric layer and the material defining the side margin may be different from each other, but are preferably the same.

The boundary between the side margin and the stack can be easily confirmed. Thus, even when the material defining the side margin is the same as the material defining the dielectric layer, the dielectric grain defining the side margin and the dielectric grain defining the dielectric layer can be clearly distinguished in some cases.

The thickness of the side margin is not limited, but is preferably, for example, about 10 μm or more and about 30 μm or less.

Each of the side margins may be provided of one layer or two or more layers.

The number of layers of the side margin can be determined by observation with a scanning electron microscope (SEM) depending on the difference in particle size of the particles defining the side margin and the presence or absence of a boundary line (interface).

The sum of the thicknesses of the first side margin and the second side margin and the sum of the dimensions of the stack in the width direction become the length of the element body in the width direction.

External Electrode

Next, the external electrodes provided on end surfaces of the element body will be described.

An electronic component is obtained by providing an external electrode on an end surface of the element body.

The external electrode is provided so as to cover the first end surface and the second end surface which are end surfaces in the length direction of the element body defining the electronic component.

The external electrode covering the first end surface of the element body is a first external electrode, and the external electrode covering the second end surface of the element body is a second external electrode.

The first external electrode is electrically connected to the first internal electrode layer exposed to the first end surface of the stack.

The second external electrode is electrically connected to the second internal electrode layer exposed to the second end surface of the stack.

The external electrode preferably includes a base electrode layer and a plating layer located on the base electrode layer.

The base electrode layer preferably includes, for example, at least one layer of a fired layer, a resin layer, and a thin film layer.

The fired layer is preferably obtained by applying a conductive paste including glass and metal to an element body and firing the paste.

The conductive paste may be fired simultaneously with the baking of the internal electrode, or may be fired after the baking of the internal electrode.

When the conductive paste is fired simultaneously with the baking of the internal electrode layer, the same dielectric ceramic as the dielectric ceramic defining the stack is preferably included as a common material in a ratio of, for example, about 30 wt % or more and less than about 40 wt %.

The fired layer fired simultaneously with the baking of the internal electrode includes glass.

Examples of the glass included in the fired layer include boric acid-based glass.

Examples of the metal included in the fired layer include Ni, Cu, Ag, Pd, Au, and alloys thereof.

The fired layer may include a plurality of layers.

The resin layer may include conductive particles and a thermosetting resin.

Examples of the conductive particles defining the resin layer include particles including, for example, Ni, Cu, Ag, Pd, Au, and alloys thereof.

Examples of the thermosetting resin defining the resin layer include epoxy resins.

The resin layer may be provided directly on an end surface of the element body.

When the resin layer is provided, the fired layer described above may not be provided, and the resin layer may be directly provided on an end surface of the element body.

The resin layer may include a plurality of layers.

The thin film layer is a layer formed by a thin film forming method such as, for example, a sputtering method or a vapor deposition method and having a thickness of about 1 μm or less on which metal particles are deposited.

Examples of the metal particles that form the thin film layer include particles including Ni, Cu, Ag, Pd, Au, and alloys thereof.

The plating layer is a layer formed by plating the surface of the base electrode layer.

The plating layer may be formed by electrolytic plating or electroless plating.

Examples of the conductive material defining the plating layer include Ni, Sn, Cu, Ag, Pd, Au, and alloys thereof.

The plating layer may include a plurality of layers. For example, the plating layer may have a two-layer structure of a Ni plating layer and a Sn plating layer provided on the surface of the Ni plating layer.

The Ni plating layer can prevent the base electrode layer from being eroded by solder when an electronic component is mounted.

The Sn plating layer can improve solder wettability and improve mountability when an electronic component is mounted.

The length (L dimension) of the electronic component in the longitudinal direction is preferably, for example, about 0.1 mm or more and about 1.0 mm or less.

The dimensions (W dimension and T dimension) of the electronic component in the width direction and the height direction are preferably, for example about 0.05 mm or more and about 0.5 mm or less, respectively.

The L dimension, the W dimension, and the T dimension of the electronic component include not only an element body but also an external electrode.

Method for Producing Electronic Component

An example embodiment of a method for producing an electronic component of the present invention includes a stack precursor preparation step of preparing a stack precursor having rectangular or substantially rectangular parallelepiped shape, the stack precursor including main surfaces opposing each other in a thickness direction, side surfaces opposing each other in a width direction orthogonal or substantially orthogonal to the thickness direction, and end surfaces opposing each other in a length direction orthogonal or substantially orthogonal to the thickness direction and the width direction, the stack precursor including a conductive paste layer to be an internal electrode layer and a dielectric ceramic layer to be a dielectric layer stacked in the thickness direction, the conductive paste layer being exposed to the side surfaces and the end surfaces, a side surface heating step of heating the side surfaces of the stack precursor to remove the conductive paste layer exposed to the side surfaces of the stack precursor and to cause particle growth of dielectric grains included in the dielectric ceramic layer adjacent to the conductive paste layer exposed to the side surfaces of the stack precursor, a side margin forming step of forming a side margin on both side surfaces in the width direction of the stack precursor that has been heated, a baking step of baking the stack precursor on which the side margin is formed to obtain an element body, and an external electrode forming step of forming an external electrode that covers one of the end surfaces in the length direction of the element body and is electrically connected to the internal electrode layer.

Stack Precursor Preparation Step

In the stack precursor preparation step, a stack precursor is prepared.

As the stack precursor preparation step, for example, a known method for producing a stack precursor of a rectangular or substantially rectangular parallelepiped formed by stacking a conductive paste layer to be an internal electrode layer and a dielectric ceramic layer to be a dielectric layer can be used.

For example, a first ceramic green sheet in which a conductive paste to be a first internal electrode layer is applied onto a dielectric sheet and a second ceramic green sheet in which a conductive paste to be a second internal electrode layer is applied onto a dielectric sheet are prepared, and the first internal electrode layer and the second internal electrode layer are stacked in different extending directions to obtain a ceramic sheet stack.

The dielectric sheet can be formed of, for example, ceramic slurry including dielectric ceramics.

The first ceramic green sheet and the second ceramic green sheet can be obtained by, for example, printing a conductive paste to be an internal electrode layer on the surface of the dielectric sheet in a predetermined pattern.

The first ceramic green sheet and the second ceramic green sheet are not necessarily stacked alternately, and a dielectric sheet to which the conductive paste is not applied may be stacked between the first ceramic green sheet and the second ceramic green sheet as necessary and desired. The distance between the first internal electrode layer and the second internal electrode layer can be thus adjusted.

When the first ceramic green sheet and the second ceramic green sheet are stacked, the upper dielectric layer and the lower dielectric layer among the dielectric layers can be formed by stacking the dielectric sheet to which the conductive paste is not applied at the lowermost stage and the uppermost stage.

The ceramic sheet stack may be a large sheet that is not divided into individual pieces, or may be a single stack.

When the ceramic sheet stack is a large sheet that is not divided into individual pieces, the ceramic sheet stack may be divided into individual pieces by cutting.

The obtained ceramic sheet stack or a piece obtained by dividing the ceramic sheet stack becomes a stack precursor.

Side Surface Heating Step

In the side surface heating step, the side surfaces of the stack precursor are heated.

Figure 8:
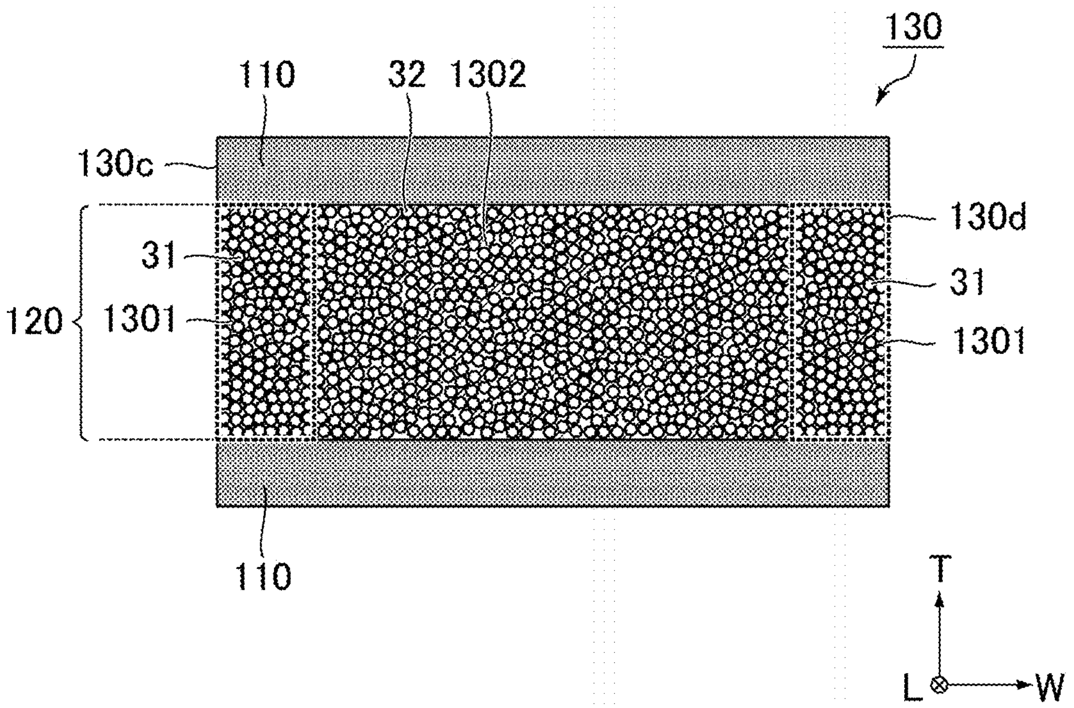
FIG. 8 is a partial cross-sectional view of a WT plane schematically illustrating a state of dielectric grains in a stack precursor of an example embodiment of the present invention before a side surface heating step is performed.
Figure 9:
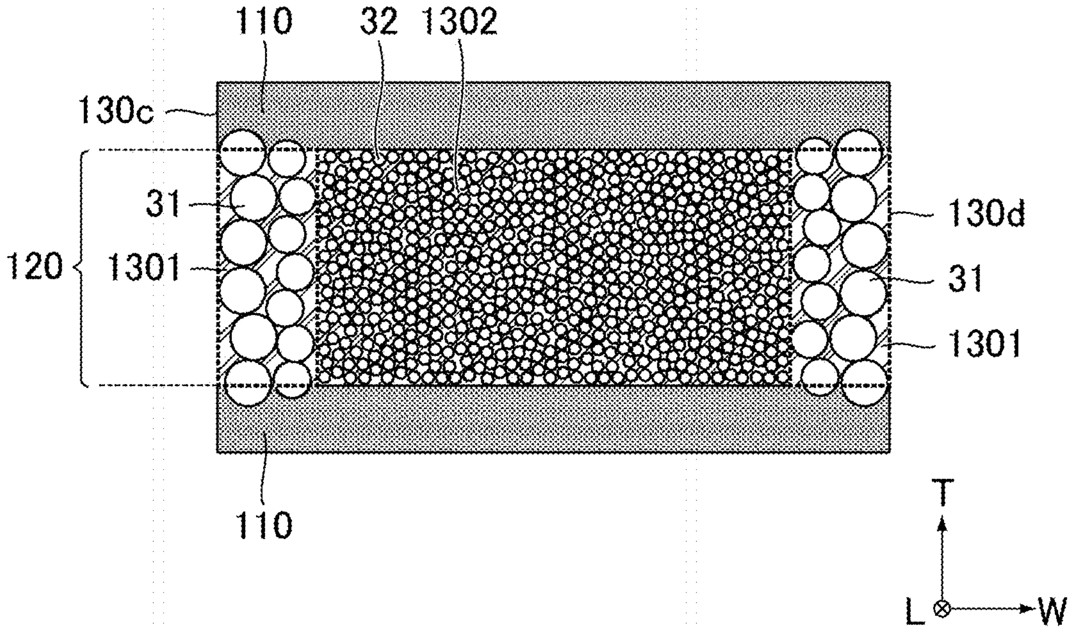
FIG. 9 is a partial cross-sectional view of a WT plane schematically illustrating a state of dielectric grains in a stack precursor of an example embodiment of the present invention after the side surface heating step is performed.

FIG. 8 is a partial cross-sectional view of a WT plane schematically illustrating a state of dielectric grains in a stack precursor before the side surface heating step is performed. FIG. 9 is a partial cross-sectional view of a WT plane schematically illustrating a state of dielectric grains in a stack precursor after the side surface heating step is performed.

As illustrated in FIG. 8, in the stack precursor 130 before the side surface heating step is performed, a conductive paste layer 110 to be an internal electrode layer and a dielectric ceramic layer 120 to be a dielectric layer are stacked.

The stack precursor 130 includes a first portion and a second portion.

A first portion 1301 and a second portion 1302 of the stack precursor 130 correspond to the first portion 301 and the second portion 302 of the stack 30.

That is, the positions of the first portion 301 and the second portion 302 when the stack 30 is formed by the baking step described later are the same as the positions of the first portion 1301 and the second portion 1302 in the stack precursor 130 before the baking step is performed.

The first portion 1301 is a portion located at an end in the width direction in a portion sandwiched between the conductive paste layers 110 of the stack precursor 130.

The second portion 1302 is a portion located at a center in the width direction in a portion sandwiched between the conductive paste layers 110 of the stack precursor 130.

As illustrated in FIG. 8, in the stack precursor 130 before the side surface heating step is performed, the average particle size of the dielectric grains 31 included in the first 1301 is equal to the average particle size of the portion dielectric grains 32 included in the second portion 1302.

In the stack precursor subjected to the side surface heating step, as illustrated in FIG. 9, the dielectric grains 31 included in the first portion 1301 undergo particle growth, and the particle size increases. On the other hand, the dielectric grains 32 included in the second portion 1302 are not affected by heating, and thus do not undergo particle growth.

As a result, the average particle size of the dielectric grains 31 included in the first portion 1301 becomes larger than the average particle size of the dielectric grains 32 included in the second portion 1302.

Although not illustrated in FIGS. 8 and 9, the stack precursor includes a third portion. The position of the third portion of the stack precursor is the same as the position of the third portion of the stack after baking.

In the side surface heating step, the side surfaces of the stack precursor are preferably, for example, heated to a temperature of about 1000° C. or higher and lower than about 1500° C., and more preferably heated to a temperature of about 1000° C. or higher and about 1300° C. or lower.

In the side surface heating step, the side surfaces of the stack precursor are preferably, for example, heated at a temperature of about 1000° C. or more and less than about 1500° C. for a time of about 100 μs or more and about 2000 μs or less.

The method for heating the side surfaces of the stack precursor is not limited, and examples thereof include irradiation with flash of light.

When the side surfaces of the stack precursor are irradiated with a flash of light, the degree of heating can be adjusted by the voltage applied to the flash of light, the irradiation time, and the number of times of irradiation with the flash of light.

Examples of the radiation source (light source) of the flash of light include xenon.

The voltage applied to the flash of light is preferably, for example, about 1500 V or more and about 2000 V or less.

By heating the side surfaces of the stack precursor in the side surface heating step, the dielectric grains included in the first portion in the vicinity of the side surfaces of the stack precursor are subjected to particle growth, and the particle size of the dielectric grains becomes larger than that before heating.

On the other hand, since the dielectric grains not in the vicinity of the side surfaces of the stack precursor are not heated by the side surface heating step, the particle size of the dielectric grains is the same as that before the side surface heating step.

Thus, in the dielectric layer, the average particle size of the dielectric grains included in the dielectric layer disposed in the vicinity of the side surfaces of the stack precursor is larger than the average particle size of the dielectric grains included in the dielectric layer not disposed in the vicinity of the side surfaces of the stack precursor.

The dielectric grains present in the vicinity of the side surfaces of the stack precursor and included in the first portion of the stack undergo particle growth in the side surface heating step.

Thus, the electronic component of the present invention can be obtained by performing the side surface heating step.

In the side surface heating step, both the first side surface and the second side surface of the stack are heated.

The first side surface and the second side surface of the stack may be heated simultaneously or individually.

When the first side surface and the second side surface of the stack are individually heated, the order is not limited, and the first side surface may be heated first and then the second side surface may be heated, or the second side surface may be heated first and then the first side surface may be heated.

When the first side surface and the second side surface are individually heated, for example, there is a method of preparing a flat plate-shaped jig including a plurality of recesses on metal, pouring the stack precursor into the recesses so that the heating target surface faces the upper surface, and heating the upper surface.

For example, using the method for treating a ceramic chip component described in JP 2020-144700 A makes it possible to transfer the stack precursor to the recess of the jig such that the heating target surface faces the upper surface.

In the side surface heating step, the dielectric grains on the side surface of the stack precursor undergo particle growth, and thus at least a portion of the side surfaces of the conductive paste layer may be covered with the grown dielectric grains. The entire side surface of the conductive paste layer may be covered with the granulated dielectric grain.

In the side surface heating step, the surface of the stack precursor is preferably heated until the average particle size of the dielectric grains that have undergone particle growth becomes about 200 nm or more and about 1000 nm or less.

In the side surface heating step, a portion of the conductive paste layer exposed to the side surface of the stack precursor is removed. Examples of the method of removing a portion of the conductive paste layer include a method of evaporating the conductive paste layer exposed to the side surface of the stack precursor by heating.

In a stack precursor obtained by cutting and dividing a ceramic sheet stack into pieces, a conductive paste to be an internal electrode is deformed at a cut surface, and a plurality of conductive paste layers stacked in a thickness direction may come into contact with each other. Removing a portion of the conductive paste layer by the above step makes it possible to remove cutting sag and prevent a short circuit of the internal electrode layer in the stack after baking.

Side Margin Forming Step

In the side margin forming step, side margins are formed on both side surfaces of the heated stack precursor in the width direction.

As the side margin forming step, for example, a conventionally known method of forming a side margin can be used.

In the side margin forming step, for example, side margins can be formed on both side surfaces in the width direction of the stack precursor by sticking a side margin forming sheet to be a side margin to both side surfaces in the width direction of the stack precursor.

The side margin forming sheet can be obtained, for example, by a method in which raw material particles defining the side margin are mixed with an organic binder and a solvent to prepare a side margin slurry, and the slurry is applied onto a flat plate and dried.

As the raw material particles defining the side margin, the same material as the material of the dielectric grain defining the dielectric sheet can be suitably used.

Baking Step

In the baking step, the stack precursor on which the side margin is formed is baked to obtain an element body.

The baking conditions are not limited, but for example, when the dielectric ceramic is barium titanate, baking may be performed at a temperature of about 1000° C. to about 1300° C. for several hours.

The baking can be performed, for example, in a reducing atmosphere or a low oxygen partial pressure atmosphere.

Through baking, the conductive paste layer becomes an internal electrode layer, and the dielectric ceramic layer becomes a dielectric layer. Since the stack precursor becomes a stack, an element body in which side margins are formed on both side surfaces of the stack is obtained.

Figure 10:
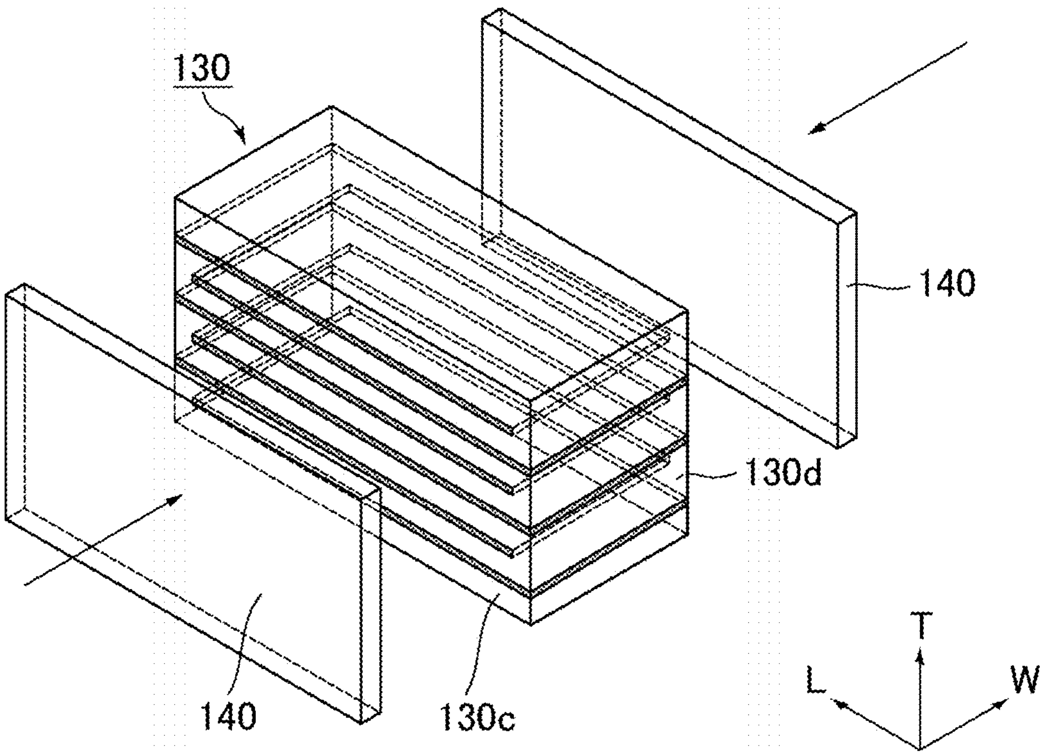
FIG. 10 is a perspective view schematically illustrating an example of a side margin forming step of an example embodiment of the present invention.
Figure 11:
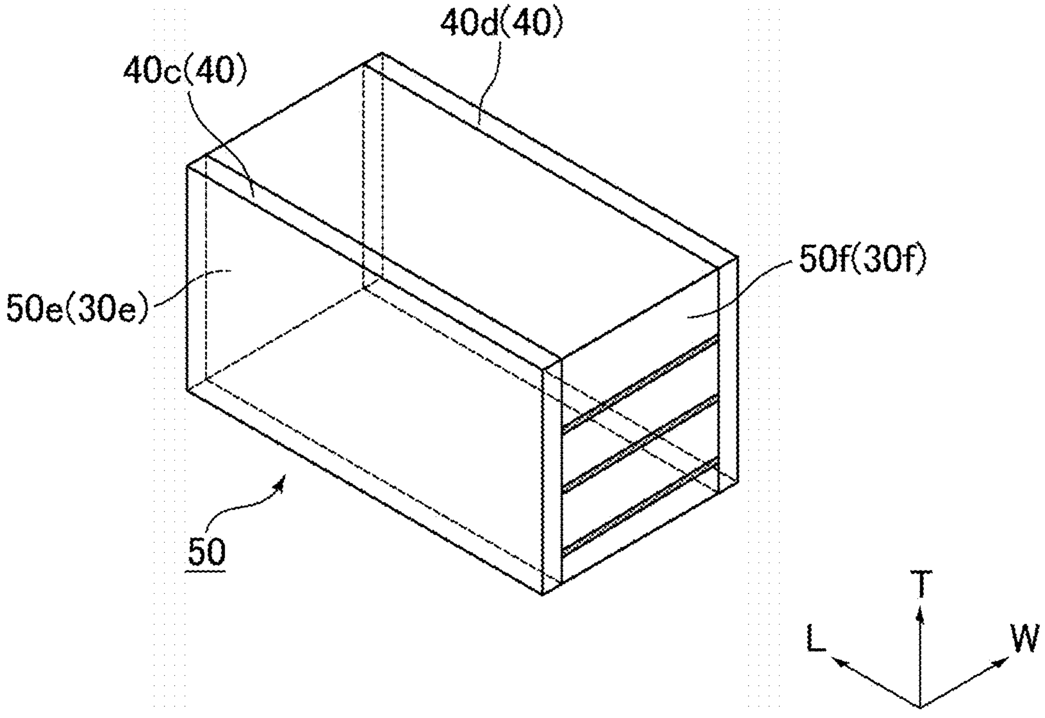
FIG. 11 is a perspective view schematically illustrating an example of an element body prepared by a baking step of an example embodiment of the present invention.

FIG. 10 is a perspective view schematically illustrating an example of the side margin forming step. FIG. 11 is a perspective view schematically illustrating an example of an element body prepared by the baking step.

As illustrated in FIG. 10, in the side margin forming step, a side margin forming sheet 140 to be a side margin is attached to a first side surface 130*c* and a second side surface 130*d* of the stack precursor 130. Subsequently, the stack precursor provided with the side margin is baked to obtain the element body 50 illustrated in FIG. 11.

The element body 50 preferably has a rectangular or substantially rectangular parallelepiped shape including the first main surface 50*a* and the second main surface 50*b* opposing each other in the thickness direction, the first side surface 50*c* and the second side surface 50*d* opposing each other in the width direction, and the first end surface 50*e* and the second end surface 50*f* opposing each other in the length direction.

The element body may be subjected to a polishing treatment such as barrel roll, for example.

Subjecting the element body to a polishing treatment such as barrel roll makes it possible to round corners and ridges of the element body.

External Electrode Forming Step

In the external electrode forming step, both end surfaces in the length direction of the element body are covered, and external electrodes electrically connected to the internal electrode layers are formed.

The method for forming an external electrode on the end surfaces of the element body is not limited, and a conventionally known method for forming an external electrode can be used.

In the external electrode forming step, for example, a base electrode forming step of forming a base electrode on the end surface of the element body and a plating layer forming step of forming a plating layer on the surface of the base electrode are preferably formed.

Figure 12:
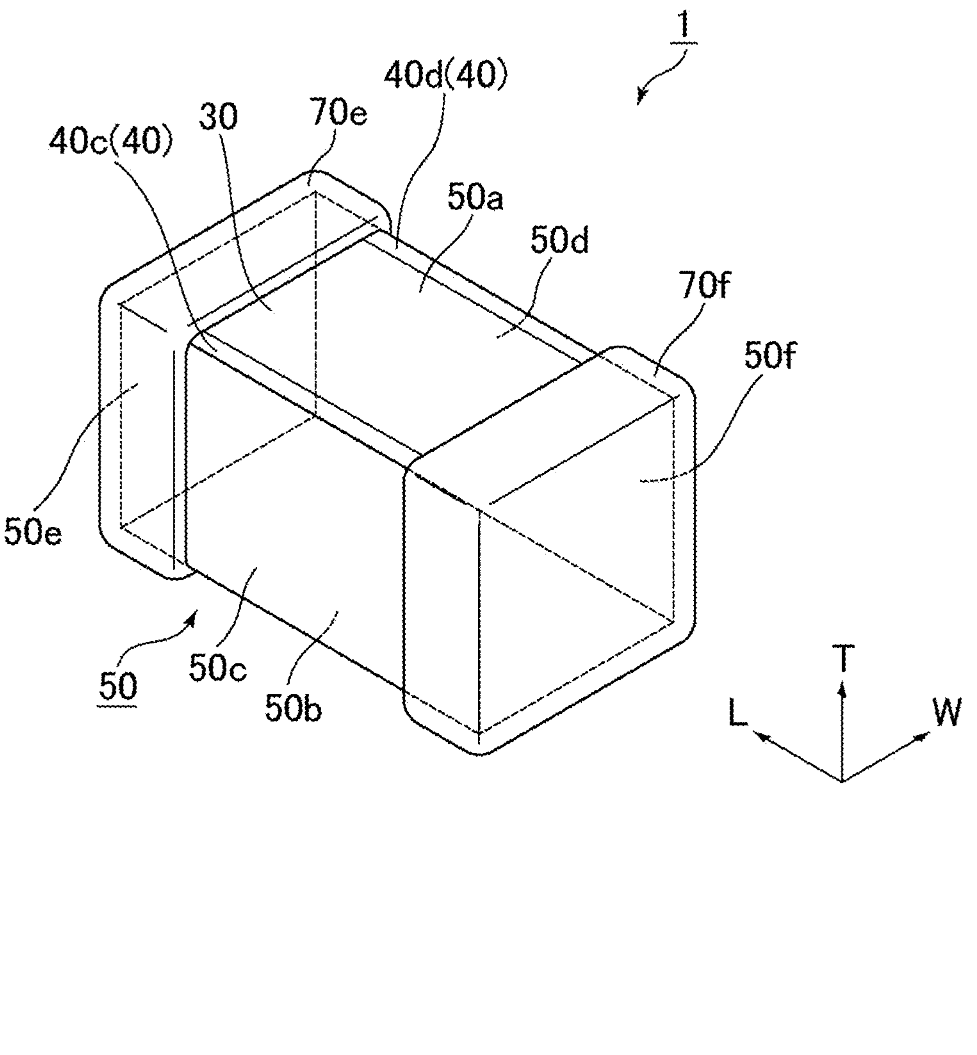
FIG. 12 is a perspective view schematically illustrating an example of an external electrode forming step of an example embodiment of the present invention.

FIG. 12 is a perspective view schematically illustrating an example of the external electrode forming step.

The electronic component 1 illustrated in FIG. 12 is obtained by respectively forming the first external electrode 70*e* and the second external electrode 70*f* on the first end surface 50*e* and the second end surface 50*f* of the element body 50 illustrated in FIG. 11.

The first external electrode 70*e* is electrically connected to the first internal electrode layer 10*e* exposed to the first end surface 50*e* of the element body 50.

The first external electrode 70*e* may cover a portion of the first main surface 50*a*, the second main surface 50*b*, the first side surface 50*c*, and the second side surface 50*d* in addition to the first end surface 50*e* of the element body 50 so as wrap around the part.

The second external electrode 70*f* is electrically connected to the second internal electrode layer 10*f* exposed to the second end surface 50*f* of the element body 50.

The second external electrode 70*f* may cover a portion of the first main surface 50*a*, the second main surface 50*b*, the first side surface 50*c*, and the second side surface 50*d* in addition to the second end surface 50*f* of the element body 50 so as to wrap around the part.

The first external electrode 70*e* and the second external electrode 70*f* are configured not to be in contact with each other.

The electronic component according to an example embodiment of the present invention can also be obtained by performing the external electrode forming step on the stack precursor on which the side margin is formed before undergoing the baking step, and then baking the stack precursor.

In particular, when a fired layer is formed as a base layer of an external electrode, the formation of the element body and the formation of the fired layer can be performed simultaneously by applying a conductive paste including glass and metal to the first end surface and the second end surface of the stack precursor on which the side margin is formed before undergoing the baking step and baking the paste.

EXAMPLES

Hereinafter, examples more specifically disclosing the present invention will be described. The present invention is not limited only to these examples.

Example 1

Stack Precursor Preparation Step

An organic binder, a plasticizer, and ethanol and toluene as a dispersion medium were added to $BaTiO_3$ as a dielectric, and subjected to wet mixing with PSZ balls by a ball mill, such that a ceramic slurry for sheet forming was produced.

The ceramic slurry was formed into a sheet by a doctor blade method to obtain a rectangular or substantially rectangular ceramic green sheet A.

A ceramic green sheet B was obtained in the same procedure.

A conductive paste including Ni as a conductive component was printed on the ceramic green sheet A to form a first ceramic green sheet and a second ceramic green sheet in which a conductive paste layer for defining an internal electrode layer was formed on the dielectric sheet.

The first ceramic green sheet and the second ceramic green sheet on which a conductive paste layer was printed were stacked so that the sides to which the conductive paste layers were drawn were alternated, and the upper and lower surfaces were sandwiched between six ceramic green sheets B, respectively, and pressed then divided into individual pieces, such that a stack precursor was obtained.

The conductive paste layer to be an internal electrode layer was exposed to both side surfaces of the obtained stack precursor.

Side Surface Heating Step

One side surface of the obtained stack precursor was irradiated with flash of light to heat the side surface of the stack precursor. The side surface temperature of the stack precursor during heating varies depending on the voltage of the flash of light. Here, the voltage of the flash of light was adjusted so that the side surface temperature of the stack precursor was about 1000° C.

Further, the other side surface of the unheated stack precursor was also irradiated with flash of light under the same conditions to be heated.

Side Margin Forming Step

A ceramic green sheet was prepared using the ceramic slurry prepared in the stack precursor preparation step to obtain a side margin forming sheet.

The side margin forming sheet was attached to both side surfaces of the stack precursor whose side surfaces were heated in the side surface heating step.

Baking Step

The stack precursor to which the side margin forming sheet was attached was heated at about 1300° C. for several hours in a reducing atmosphere to obtain an element body.

External Electrode Forming Step

A slurry of glass and metal particles was applied to an end surface of the obtained element body, then baked at about 800° C. to about 900° C. for several hours to form a fired electrode, thereafter a Ni/Sn plated layer was formed by plating treatment, whereby an electronic component according to Example 1 in which the external electrode was formed on the end surface of the element body.

The average thickness of the internal electrode layers was about 450 nm, and the number of internal electrode layers was about 300.

The thickness of each of the upper electrode layer, the intermediate dielectric layer, and the lower electrode layer was about 0.3 to about 0.4 μm, and the number of dielectric layers was 1000 in total including the upper electrode layer, the intermediate electrode layer, and the lower dielectric layer.

Dimensions of the obtained electronic component were a thickness of about 0.5 mm, a height of about 0.5 mm, and a length of about 1 mm in consideration of the external electrode layer and tolerance.

Examples 2 to 5 and Comparative Examples 1 to 3

Electronic components according to Examples 2 to 5 and Comparative Examples 2 to 3 were produced in the same procedure as in Example 1 except that the voltage applied to the flash of light was adjusted in the side surface heating step and the heating temperature for the stack side surface at the time of heating was changed as shown in Table 1.

In addition, an electronic component according to Comparative Example 1 was produced by the same procedure as in Example 1 except that the side surface heating step was not performed.

TABLE 1

| | Heating temperature side surface [° C.] | Average particle size of dielectric grain [nm] Second portion | First portion | Delamination |
|---|---|---|---|---|
| Example 1 | 1000 | 56 | 210 | 0/500 |
| Example 2 | 1100 | 42 | 351 | 0/500 |
| Example 3 | 1200 | 49 | 542 | 0/500 |
| Example 4 | 1300 | 48 | 627 | 0/500 |
| Example 5 | 1400 | 48 | 730 | 0/500 |
| Comparative Example 1 | — | 49 | 45 | 11/500 |
| Comparative Example 2 | 400 | 49 | 48 | 4/500 |
| Comparative Example 3 | 1500 | 53 | — | Unmeasurable |

Measurement of Average Particle Size of Dielectric Grain included in First Portion and Second Portion The electronic component according to each Example and each Comparative Example was cut at substantially the center in the length direction, and then polished, and the WT cross section was photographed with a SEM to determine the average particle size of the dielectric grains of the first portion and the second portion. The results are shown in Table 1.

Reliability Test

Using 500 electronic components according to each of Examples and Comparative Examples, a voltage (25 V) lower than the dielectric breakdown voltage (65 V) but higher than the rated voltage (10 V) was applied, and then the insulation resistance value was measured. The number of samples in which the measured insulation resistance value was below a predetermined value (45.5 MΩ) was checked. The results are shown in Table 1.

Since the insulation resistance value decreases when peeling occurs between the internal electrode layer and the dielectric layer, it can be said that peeling easily occurs between the internal electrode layer and the dielectric layer as the number of samples whose insulation resistance value falls below the predetermined value increases.

From the results in Table 1, it was discovered that delamination can be reduced or prevented in Examples 1 to 5 in which the side surface of the stack precursor was heated to a temperature of about 1000° C. or more and less than about 1500° C.

In Examples 1 to 5, it was confirmed that the dielectric grains included in the first portion underwent particle growth. It is considered that since the average particle size of the dielectric grains included in the first portion was larger than the average particle size of the dielectric grains included in the second portion through the side surface heating step, adhesion between the internal electrode layer and the dielectric layer was increased at the end in the width direction of the internal electrode layer, and peeling was able to be reduced or prevented.

On the other hand, in Comparative Example 1 in which the side surface heating step was not performed and Comparative Example 2 in which the output of the flash of light was greatly reduced and the end surface of the stack precursor was heated at about 400° C., delamination could not be reduced or prevented. This is presumably because the dielectric grains included in the first portion were not sufficiently heated and have not undergo particle growth in the side surface heating step.

In the electronic component according to Comparative Example 3, a portion of the conductive paste layer was evaporated in the side surface heating step, and the electronic component did not function as an electronic component. It was also impossible to measure the average particle size of the dielectric grains included in the first portion. Thus, the evaluation of delamination is not performed.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:

an element body including a stack and a side margin, the stack having a rectangular or substantially rectangular parallelepiped shape and including main surfaces opposing each other in a thickness direction, side surfaces opposing each other in a width direction orthogonal or substantially orthogonal to the thickness direction, and end surfaces opposing each other in a length direction orthogonal or substantially orthogonal to the thickness direction and the width direction, the stack including internal electrode layers and a dielectric layer stacked in the thickness direction, the side margin covering each of side surfaces of the stack in the width direction; and an external electrode covering one of the end surfaces of the element body in the length direction and electrically connected to at least one of the internal electrode layers; wherein the stack includes a first portion located at an end in the width direction of the stack in a portion sandwiched between the internal electrode layers in the thickness direction, and a second portion located at a center in the width direction of the stack in the portion sandwiched between the internal electrode layers in the thickness direction;

each of the first portion and the second portion extends from one of the internal electrode layers that is closest to one of the main surfaces in the thickness direction to another of the internal electrode layers that is closest to another of the main surfaces in the thickness direction; and an average particle size of dielectric grains included in the first portion is larger than an average particle size of dielectric grains included in the second portion.

2. The electronic component according to claim 1, wherein the stack further includes a third portion located at an end in the width direction in the portion sandwiched between the dielectric layers in the thickness direction; and at least a portion of the end in the width direction of the internal electrode layers is covered with the dielectric grains included in the third portion.

3. The electronic component according to claim 2, wherein an average particle size of the dielectric grains included in the third portion is larger than the average particle size of the dielectric grains included in the second portion.

4. The electronic component according to claim 2, wherein an entire or substantially an entire end of the internal electrode layers is covered with the dielectric grains included in the third portion.

5. The electronic component according to claim 2, wherein an average particle size of the dielectric grains included in the third portion is larger than a thickness of the internal electrode layers.

6. The electronic component according to claim 1, wherein the average particle size of the dielectric grains included in the first portion is about 200 nm or more and about 1000 nm or less.

7. A method for producing the electronic component according to claim 1, the method comprising:

a stack precursor preparation step of preparing a stack precursor having rectangular or substantially rectangular parallelepiped shape, the stack precursor including main surfaces opposing each other in a thickness direction, side surfaces opposing each other in a width direction orthogonal to the thickness direction, and end surfaces opposing each other in a length direction orthogonal or substantially orthogonal to the thickness direction and the width direction, the stack precursor including conductive paste layers to be the internal electrode layers and a dielectric ceramic layer to be the dielectric layer stacked in the thickness direction, the conductive paste layer being exposed to the side surfaces and the end surfaces;

a side surface heating step of heating the side surfaces of the stack precursor to remove the conductive paste layer exposed to the side surfaces of the stack precursor and to cause particle growth of dielectric grains included in the dielectric ceramic layer adjacent to the conductive paste layer exposed to the side surfaces of the stack precursor;

a side margin forming step of forming the side margin on two side surfaces in the width direction of the stack precursor that has been heated;

a baking step of baking the stack precursor on which the side margin is formed to obtain the element body; and an external electrode forming step of forming the external electrode that covers one of the end surfaces in the length direction of the element body and is electrically connected to the internal electrode layer.

8. The method for producing an electronic component according to claim 7, wherein in the side surface heating step, the side surfaces of the stack precursor are irradiated with a flash of light.

9. The method for producing an electronic component according to claim 8, wherein the flash of light is performed with a predetermined voltage level, a predetermined irradiation time, and a predetermined number of irradiations.

10. The method for producing an electronic component according to claim 7, wherein in the side surface heating step, the side surfaces of the stack precursor are heated to a temperature of about 1000° C. or higher and lower than about 1500° C.

11. The method for producing an electronic component according to claim 10, wherein in the side surface heating step, the side surfaces of the stack precursor are heated for a time of about 100 us or more and about 2000 us or less.

12. The method for producing an electronic component according to claim 7, wherein an average particle size of the dielectric grains subjected to particle growth is about 200 nm or more and about 1000 nm or less.

13. The method for producing an electronic component according to claim 7, wherein in the side surface heating step, at least a portion of a side surface of the conductive paste layer is covered with the dielectric grains subjected to particle growth.

14. The method for producing an electronic component according to claim 7, wherein in the side surface heating step, an entire or substantially an entire side surface of at least one of the conductive paste layers is covered with the dielectric grains subjected to particle growth.

15. The electronic component according to claim 1, further comprising an additional external electrode covering another one of the end surfaces of the element body in the length direction, the external electrode and the additional external electrode not being in contact with one another.

16. The electronic component according to claim 1, wherein the dielectric layer includes an intermediate dielectric layer, an upper dielectric layer, and a lower dielectric layer.

17. The electronic component according to claim 16, wherein a thickness of the intermediate dielectric layer is about 0.3 μm or more and about 0.45 μm or less; and a thickness of each of the upper dielectric layer and the lower dielectric layer is about 10 μm or more and about 30 μm or less.

18. The electronic component according to claim 1, wherein the dielectric layer includes 100 or more to 600 or fewer total dielectric layers and the internal electrode layers include 100 or more and 600 or fewer total electrode layers.

19. The electronic component according to claim 1, wherein one end of each of the internal electrode layers, which is not in contact with the external electrode, is separated from the end surface of the element body by a gap in the length direction of about 5 μm or more and about 30 μm or less.

20. The electronic component according to claim 1, wherein internal electrode layers include a projected area normal to the thickness direction which is about 80% or more and about 95% or less of a projected area of the dielectric layer normal to the thickness direction.

* * * * *